A. W. SMITH AND G. A. COLLINS.
FUEL BURNER.
APPLICATION FILED APR. 3, 1920.
1,414,438. Patented May 2, 1922.
2 SHEETS—SHEET 1.
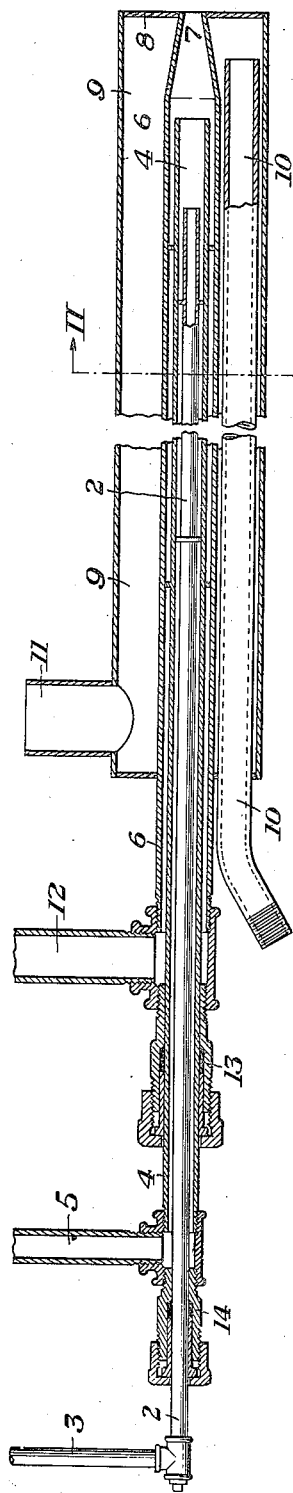
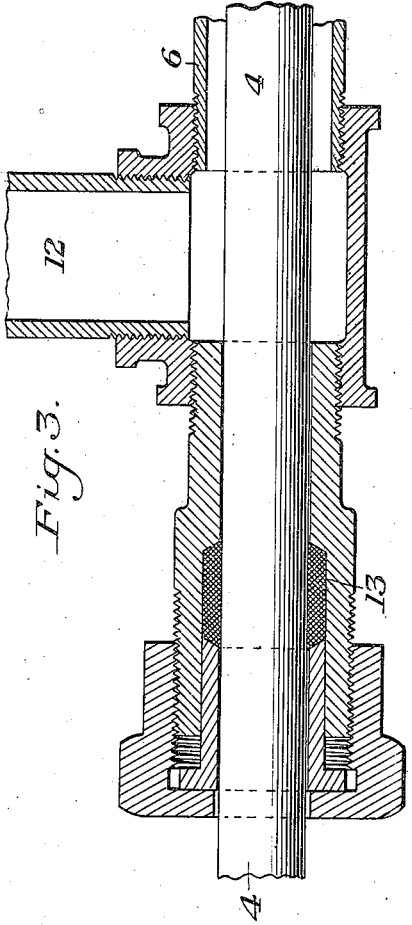
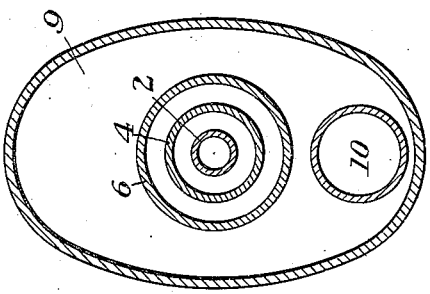
Inventors
Albert W. Smith,
George A. Collins,
By Bakewell, Byrnes & Parmelee
Attorneys

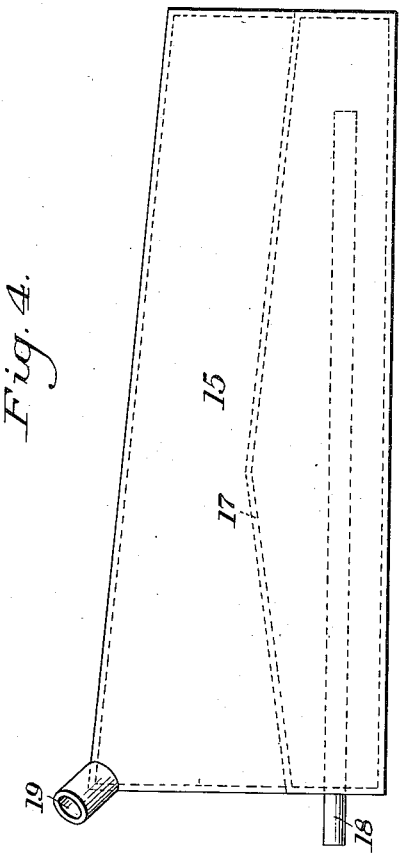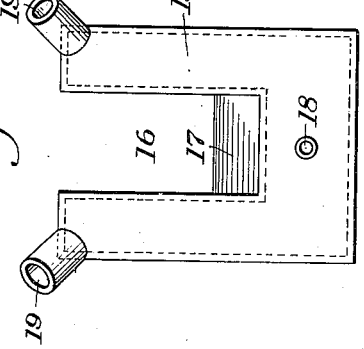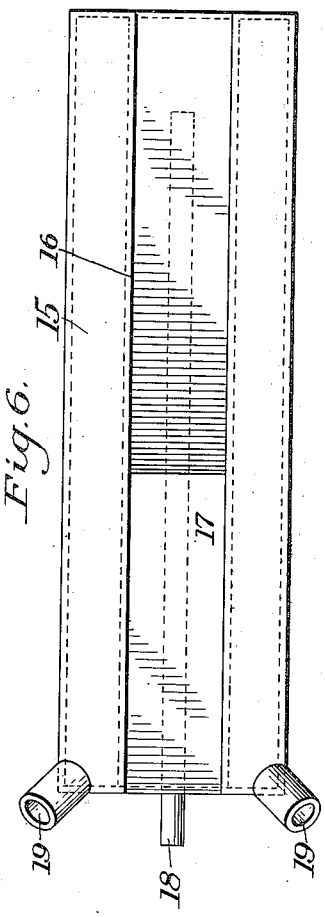

UNITED STATES PATENT OFFICE.

ALBERT W. SMITH AND GEORGE A. COLLINS, OF YOUNGSTOWN, OHIO.

FUEL BURNER.

1,414,438.    Specification of Letters Patent.    Patented May 2, 1922.

Application filed April 3, 1920. Serial No. 371,028.

*To all whom it may concern:*

Be it known that we, ALBERT W. SMITH and GEORGE A. COLLINS, citizens of the United States, and both of Youngstown, in the county of Mahoning and State of Ohio, have invented a new and useful Improvement in Fuel Burners, of which the following is a full, clear, and exact description, reference being had to the accompanying drawings, forming part of this specification, in which:—

Figure 1 is a longitudinal sectional view of one form of fuel burner embodying our invention;

Figure 2 is a section taken on the line II—II of Figure 1, on a larger scale;

Figure 3 is a longitudinal section of a portion of the structure shown in Figure 1, and on a larger scale; and Figures 4, 5 and 6 are, respectively, side, end and top plan views of a different form of cooling chamber which may be employed.

Our invention has relation to fuel burners of the injector type and adapted for use in connection with furnaces and with liquid, gaseous, or powdered fuels, or with a combination of such fuels.

Our invention is designed to provide a burner of this character in which the parts exposed to the heat of the furnace are protected therefrom by cooling means of efficient character; to provide means whereby the pipes which supply the fuel or fuels, together with the pipes or ducts which supply the impelling, atomizing and preheating mediums may be readily adjusted, both with respect to each other and with respect to the nozzle of the burner so as to secure the most efficient action of the burner under varying conditions.

The nature of our invention will be best understood by reference to the accompanying drawings, which will now be described, it being premised, however, that various changes can be made in the details of construction, arrangement and combination of the parts, without departing from the spirit and scope of our invention as defined in the appended claims.

Referring first to the structure shown in Figures 1, 2 and 3, the numeral 2 designates a fuel supply pipe having a supply connection, such as indicated at 3 at its rear end. 4 is a pipe which is placed concentrically around the pipe 3, and which has a supply connection 5 for a medium, such as steam, which may be used to preheat the fuel passing through the pipe 2, and also mix with said fuel after its discharge from the pipe 2. Concentrically surrounding the pipes 2 and 4 is a pipe 6, having a converging or straight nozzle 7 adapted to discharge into the furnace, said nozzle extending beyond the discharge end of the pipe 4. In the form shown in these figures, the nozzle 7 is tightly secured at its forward end in the end wall 8 of a cooling chamber 9, which surrounds the forward end portion of all of the said pipes, the latter passing through and beyond the rear wall of said chamber, and the pipe 6 being secured in the opening in said rear wall by a welded or other suitable tight joint. 10 designates a pipe for admitting water or other cooling fluid to the interior of the chamber 9, this pipe preferably entering said chamber at its rear end and extending forwardly to a point near the front end of the chamber. 11 designates an outlet connection for the cooling fluid from said chamber. 12 is an inlet connection for the pipe 6, which is adapted to supply steam or other impelling or atomizing medium for the fuel. The rear end portion of the pipe 6 is provided with a stuffing box 13, through which the rear end portion of the pipe 4 extends and whereby said pipe 4 may be adjusted longitudinally in the pipe 6 for the purpose of varying the position of its discharge end with respect to the nozzle 7. Similarly, the rear end portion of the pipe 4 is provided with a stuffing box 14, in which the rear portion of the pipe 2 is slidably seated, so as to provide for an adjustment of said pipe with respect to the pipe 4 and nozzle 7.

By means of this adjustment, the form and distribution of the flame at the nozzle 7, which extends within the furnace supplied by the burner, may be changed so as to secure the most effective results. Also the discharge end of the several pipes may be so adjusted with respect to each other as to secure the most effective mixing, impelling and atomizing actions.

In some instances, it is desirable to provide for the adjustment of the entire burner structure with respect to the cooling chamber. In Figures 4, 5 and 6, we have shown a cooling chamber which is in the nature of a support for the burner, and on which the burner can be longitudinally adjusted. This cooling structure comprises an elongated hollow box 15, having the longitudinal slot 16, whose bottom wall 17 forms a support for the burner, the water-cooled side walls of this slot extending upwardly at opposite sides of the burner pipe. 18 indicates an inlet for the cooling fluid, and 19 are outlets placed at the upper corners of the structure at opposite sides of the slot or seat 16. It will be readily seen that a burner, such as shown in Figure 1, or other suitable construction, may be adjustably supported in and upon this cooling structure, the burner and cooling structure being adjustable with respect to each other and the furnace, in order to give the best results in any particular case.

A multiple pipe burner, such as shown in Figure 1, but without the surrounding water jacket 9, can be supported in the structure shown in Figures 4, 5 and 6, the burner being movable longitudinally of said support to vary the point at which it will discharge into the furnace; and being also movable laterally to vary the angle of discharge. The burner can also be tilted on the high point of the floor 17, so as to vary its discharge in a vertical plane.

We claim:

1. A fuel burner comprising a plurality of concentric pipes telescopically arranged for independent longitudinal sliding movement with respect to each other, and an exterior cooling chamber for said pipes having connections for circulating a cooling medium therethrough, substantially as described.

2. A fuel burner comprising a plurality of concentric pipes telescopically arranged for independent longitudinal sliding movement with respect to each other, the outer of said pipes having a nozzle through which the other of said pipes are arranged to discharge, and an exterior cooling chamber for said pipes having connections for circulating a cooling medium therethrough, substantially as described.

3. In a fuel burner, an exterior cooling chamber having connections for circulating a cooling medium therethrough, and also having a longitudinal seat therein, in combination with a fuel supply device mounted on said seat and movable longitudinally of said chamber, substantially as described.

4. In a fuel burner, an exterior cooling chamber having connections for circulating a cooling medium therethrough, and also having a longitudinal seat therein, in combination with a fuel supply and mixing device mounted on said seat and movable longitudinally of said chamber, said device comprising a plurality of concentric pipes or ducts adjustable longitudinally with respect to each other, substantially as described.

5. In a fuel burner, an exterior cooling chamber having connections for circulating a cooling medium therethrough, and also having a longitudinal seat therein, in combination with a fuel supply device mounted on said seat and movable longitudinally, vertically or horizontally of said chamber, substantially as described.

6. In a fuel burner, an exterior cooling chamber having connections for circulating a cooling medium therethrough, and also having a longitudinal seat therein, in combination with a fuel supply and a mixing device mounted on said seat and movable longitudinally, vertically or horizontally of said chamber, said device comprising a plurality of concentric pipes or ducts adjustable longitudinally with respect to each other, substantially as described.

7. A fuel burner comprising an inner fuel supply pipe, a second pipe for an impelling fluid surrounding the fuel pipe and terminating beyond the inner end of the fuel pipe, another pipe for impelling fluid surrounding the first named pipes and terminating in a nozzle which discharges a material distance in advance of the discharge of the second pipe, the longitudinally separated points of discharge of the two impelling fluid pipes acting to give a multiple or two-stage atomization of the fuel discharged by the fuel supply pipe, and means cooperating with said nozzle and with said burner throughout a considerable portion of its length for cooling said burner, substantially as described.

8. A fuel burner comprising an inner fuel supply pipe, a second pipe for an impelling fluid surrounding the fuel pipe and terminating beyond the entire inner end of the fuel pipe, another pipe for impelling fluid surrounding the first named pipes and terminating in a nozzle which discharges a material distance in advance of the discharge end of the second pipe, said first and second pipes being separately slidable longitudinally with respect to each other and with respect to the third pipe for changing the relative points of discharge of said fluid pipes, the longitudinally separated points of discharge of the two impelling pipes acting to give a multiple or two-stage atomization of the fuel discharge by the fuel supply pipe, and cooling means cooperating with said nozzle and said burner throughout a considerable portion of its length, substantially is described.

9. A fuel burner comprising an inner fuel supply pipe, a second pipe for an impelling fluid surrounding the fuel pipe and terminating beyond the inner end of the fuel pipe, and another pipe for impelling fluid surrounding the first named pipes and terminating in a nozzle which discharges in advance of the discharge end of the second pipe, together with a cooling chamber surrounding said pipes and within which the latter are separately adjustable longitudinally, substantially as described.

10. A fuel burner comprising an inner fuel supply pipe, a second pipe surrounding the fuel supply pipe and discharging beyond the inner end of the latter, said second pipe having connections for impelling fluid, a packed sliding joint between the two pipes to permit free adjustment of their relative points of discharge, and another pipe for an impelling fluid surrounding the first named pipes and terminating in a nozzle portion which normally extends a material distance in advance of the point of discharge of the second pipe, the third named pipe being slidably mounted upon the second named pipe to permit of adjustment of the point of discharge of the third pipe with respect to the point of discharge of the other pipes, substantially as described.

In testimony whereof we have hereunto set our hands.

ALBERT W. SMITH.
GEO. A. COLLINS.